United States Patent
Yoshimochi et al.

(10) Patent No.: US 10,117,001 B2
(45) Date of Patent: Oct. 30, 2018

(54) DATA PROCESSING DEVICE AND DATA PROCESSING METHOD

(71) Applicant: SONY CORPORATION, Tokyo (JP)

(72) Inventors: Naoki Yoshimochi, Kanagawa (JP); Makiko Yamamoto, Tokyo (JP); Takashi Yokokawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/028,801

(22) PCT Filed: Jan. 6, 2015

(86) PCT No.: PCT/JP2015/050090
§ 371 (c)(1),
(2) Date: Apr. 12, 2016

(87) PCT Pub. No.: WO2015/107924
PCT Pub. Date: Jul. 23, 2015

(65) Prior Publication Data
US 2016/0255416 A1     Sep. 1, 2016

(30) Foreign Application Priority Data
Jan. 16, 2014   (JP) ................................ 2014-005654

(51) Int. Cl.
*H04N 21/236*    (2011.01)
*H04N 21/633*    (2011.01)
(Continued)

(52) U.S. Cl.
CPC .......... *H04N 21/814* (2013.01); *H04H 20/59* (2013.01); *H04H 20/95* (2013.01);
(Continued)

(58) Field of Classification Search
CPC ........................ H04N 21/236; H04N 21/633
(Continued)

(56) References Cited

U.S. PATENT DOCUMENTS

2012/0314762 A1    12/2012   Herrmann et al.
2012/0327955 A1*   12/2012   Herrmann ............ H04N 21/235
                                                              370/476

FOREIGN PATENT DOCUMENTS

CN           101911818       12/2010
JP         2007-251298 A      9/2007
(Continued)

OTHER PUBLICATIONS

"Digital Video Broadcasting (DVB); Implementation Guidelines for a second generation digital cable transmission system (DVB-C2)", ETSI TS 102 991 V1.2.1, Jun. 2011, (13 pages).
(Continued)

*Primary Examiner* — Dominic D Saltarelli
(74) *Attorney, Agent, or Firm* — Oblon, McClelland, Maier & Neustadt, L.L.P.

(57) ABSTRACT

The present technique relates to a data processing device and a data processing method, capable of promptly issuing an emergency alarm under the DVB-C2.
A transmission device generates L1 signalling including an emergency alarm signal related to an emergency alarm, in L1 signalling Part 2 under the digital video broadcasting (DVB)-C2. A reception device processes the L1 signalling obtained from data transmitted from the transmission device. The present technique can be applied, under the DVB-C2, for example, to a case where an emergency alarm is issued.

17 Claims, 8 Drawing Sheets

(51) Int. Cl.
    *H04N 21/81* (2011.01)
    *H04H 20/59* (2008.01)
    *H04H 20/95* (2008.01)
    *H04N 21/488* (2011.01)
    *H04N 21/2383* (2011.01)
    *H04N 21/61* (2011.01)

(52) U.S. Cl.
    CPC ... *H04N 21/2383* (2013.01); *H04N 21/23605* (2013.01); *H04N 21/4882* (2013.01); *H04N 21/6118* (2013.01)

(58) Field of Classification Search
    USPC .......................................................... 725/33
    See application file for complete search history.

(56) References Cited

FOREIGN PATENT DOCUMENTS

| | | |
|---|---|---|
| JP | 2013-520850 A | 6/2013 |
| WO | 2009/084837 | 7/2009 |

OTHER PUBLICATIONS

"Emergency Alert Messaging for Cable" Society of Cable Telecommunications Engineers, ANSI/SCTE 18, 2007, (17 pages).

"Digital Video Broadcasting (DVB); Frame structure channel coding and modulation for a second generation digital transmission system for cable systems (DVB-C2)", ETSI EN 302 769 V1.2.1, Apr. 2011, (111 pages).

International Search Report dated Apr. 7, 2015 for PCT/JP2014/050090 filed on Jan. 6, 2015.

Extended Search Report dated Aug. 4, 2017 in European Patent Application No. 15737268.1.

"Digital Video Broadcasting (DVB); Implementation Guidelines for a second generation digital cable transmission System (DVB-C2)", ETSI TS 102 991, VI.2.1, Jun. 1, 2011, pp. 1-165.

Office Action dated Jul. 31, 2018 in Chinese Patent Application No. 201580003027.9 (With English Translation) p. 1-15.

\* cited by examiner

FIG. 4

The signalling fields of L1 signalling part 2 data

| Field | Size(bits) |
|---|---|
| NETWORK_ID | 16 |
| C2_SYSTEM_ID | 16 |
| START_FREQUENCY | 24 |
| C2_BANDWIDTH | 16 |
| GUARD_INTERVAL | 2 |
| C2_FRAME_LENGTH | 10 |
| L1_PART2_CHANGE_COUNTER | 8 |
| NUM_DSLICE | 8 |
| NUM_NOTCH | 4 |
| for i=0..NUM_DSLICE-1 { | |
|     DSLICE_ID | 8 |
|     DSLICE_TUNE_POS | 14 or 13 |
|     DSLICE_OFFSET_LEFT | 9 or 8 |
|     DSLICE_OFFSET_RIGHT | 9 or 8 |
|     DSLICE_TI_DEPTH | 2 |
|     DSLICE_TYPE | 1 |
|     if DSLICE_TYPE=='1' { | |
|         FEC_HEADER_TYPE | 1 |
|     } | |
|     DSLICE_CONST_CONF | 1 |
|     DSLICE_LEFT_NOTCH | 1 |
|     DSLICE_NUM_PLP | 8 |
|     for i=0..DSLICE_NUM_PLP-1 { | |
|         PLP_ID | 8 |
|         PLP_BUNDLED | 1 |
|         PLP_TYPE | 2 |
|         PLP_PAYLOAD_TYPE | 5 |
|         if PLP_TYPE=='00' or '01' { | |
|             PLP_GROUP_ID | 8 |
|         } | |
|         if DSLICE_TYPE=='0' { | |
|             PLP_START | 14 |
|             PLP_FEC_TYPE | 1 |
|             PLP_MOD | 3 |
|             PLP_COD | 3 |
|         } | |
|         PSI/SI_REPROCESSING | 1 |
|         if PSI/SI_REPROCESSING=='0' { | |
|             transport_stream_id | 16 |
|             original_network_id | 16 |
|         } | |
| A1 →     RESERVED_1 | 8 |
|     } | |
| A2 → RESERVED_2 | 8 |
| } | |
| for i=0..NUM_NOTCH-1 { | |
|     NOTCH_START | 14 or 13 |
|     NOTCH_WIDTH | 9 or 8 |
| A3 →     RESERVED_3 | 8 |
| } | |
| RESERVED_TONE | 1 |
| A4 → RESERVED_4 | 16 |

DATA PROCESSING DEVICE AND DATA PROCESSING METHOD

TECHNICAL FIELD

The present technique relates to a data processing device and a data processing method, for example, a data processing device and a data processing method capable of promptly issuing an emergency alarm under DVB-C2.

BACKGROUND ART

Examples of transmission standards of cable television broadcasting include digital video broadcasting (DVB)-C2 that has been standardized in DVB as a next-generation cable television standard (Non-Patent Document 1).

Under the DVB-C2, highly efficient modulation schemes, coding schemes, physical layer pipe (PLP) bundling, or the like, are defined.

CITATION LIST

Non-Patent Document

Non-Patent Document 1: DVB-C.2: ETSI EN 302 769 V1.2.1 (2011 April)

SUMMARY OF THE INVENTION

Problems to be Solved by the Invention

Currently, introduction of the DVB-C2 to cable television broadcasting in Japan is under review.

Since earthquakes occur highly frequently in Japan, prompt issuance of an emergency alarm on an earthquake is extremely highly demanded.

Also in areas other than Japan, prompt issuance of an emergency alarm on a disaster such as tsunami and tornadoes is highly demanded.

In the DVB-C2, however, transmission of an emergency alarm signal related to the emergency alarm has not been defined.

The present technique is provided in view of this circumstance and aims to achieve prompt issuance of the emergency alarm under the DVB-C2.

Solutions to Problems

A first data processing device according to the present technique is a data processing device including a generation unit configured to generate, in L1 signalling part 2 under the digital video broadcasting (DVB)-C2, L1 signalling including an emergency alarm signal related to an emergency alarm.

The first data processing method according to the present technique is a data processing method including a step to generate, in the L1 signalling part 2 under the digital video broadcasting (DVB)-C2, L1 signalling including an emergency alarm signal related to an emergency alarm.

In the first data processing device and the data processing method according to the present technique, L1 signalling including an emergency alarm signal related to an emergency alarm is generated in the L1 signalling part 2 under the digital video broadcasting (DVB)-C2.

The second data processing device according to the present technique is a data processing device including a processing unit configured to process L1 signalling obtained from data transmitted from a transmission device equipped with a generation unit configured to generate, in the L1 signalling part 2 under the digital video broadcasting (DVB)-C2, the L1 signalling including an emergency alarm signal related to emergency alarm.

The second data processing method according to the present technique is a data processing method including a step of processing L1 signalling obtained from data transmitted from the transmission device equipped with the generation unit configured to generate, in the L1 signalling part 2 under the digital video broadcasting (DVB)-C2, the L1 signalling including the emergency alarm signal related to the emergency alarm.

According to the second data processing device and data processing method of the present technique, the L1 signalling obtained from the data transmitted from the transmission device is processed. The transmission device is equipped with the generation unit configured to generate, in the L1 signalling part 2 under the digital video broadcasting (DVB)-C2, the L1 signalling including the emergency alarm signal related to the emergency alarm.

The data processing device may be a separate device or may be an internal block that configures one device.

Effects of the Invention

According to the present technique, it is possible to promptly issue an emergency alarm under the DVB-C2.

Note that effects described herein are non-limiting. The effects may be any effects described in the present disclosure.

BRIEF DESCRIPTION OF DRAWINGS

FIG. 4 is a diagram illustrating a format (syntax) of L1 signalling part 2.

MODE FOR CARRYING OUT THE INVENTION

<Embodiment of Transmission System to which Present Technique is Applied>

Figure 1:
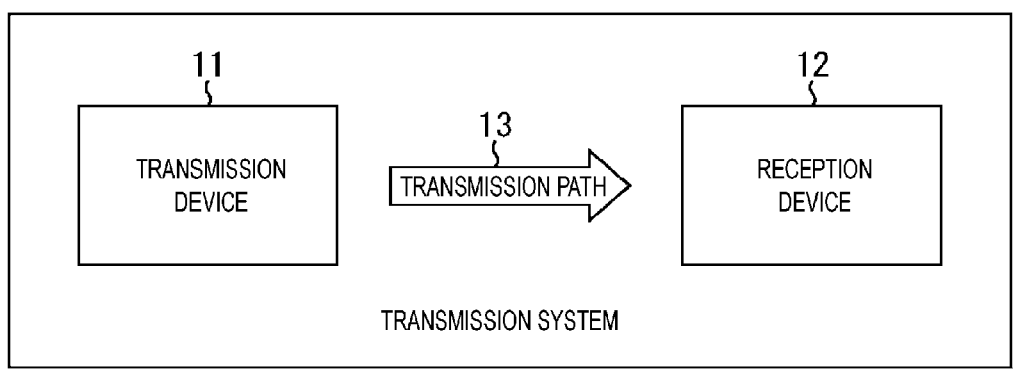
FIG. 1 is a block diagram illustrating an exemplary configuration according to an embodiment of a transmission system to which the present technique is applied.

FIG. 1 is a block diagram illustrating an exemplary configuration according to an embodiment of a transmission system to which the present technique is applied. (Herein, the system represents a plurality of devices that is logically set. Accordingly, devices in individual configurations need not be placed in a same housing.)

In FIG. 1, the transmission system includes a transmission device 11 and a reception device 12.

The transmission device 11 executes, for example, transmission (digital broadcasting) (data broadcasting) of television broadcasting program, or the like. Specifically, the transmission device 11 transmits, for example, a stream of target data, namely, a target of transmission, such as image data and sound data as a program, for example, via a transmission path 13 that is a cable television network (wired channel), in accordance with a DVB-C2 standard.

The reception device 12 receives data transmitted from the transmission device 11 via the transmission path 13, restores the data as an original stream, and outputs the data.

Note that the transmission system in FIG. 1 can be applied to data transmission that conforms to the DVB-C2 standard, data transmission that conforms to DVB-T2, DVB-S2, advanced television systems committee standards (ATSC), or the like, and other data transmission.

As the transmission path 13, cable television networks, satellite channels, terrestrial channels, or the like, can be employed.

<Exemplary Configuration of Transmission Device 11>

Figure 2:
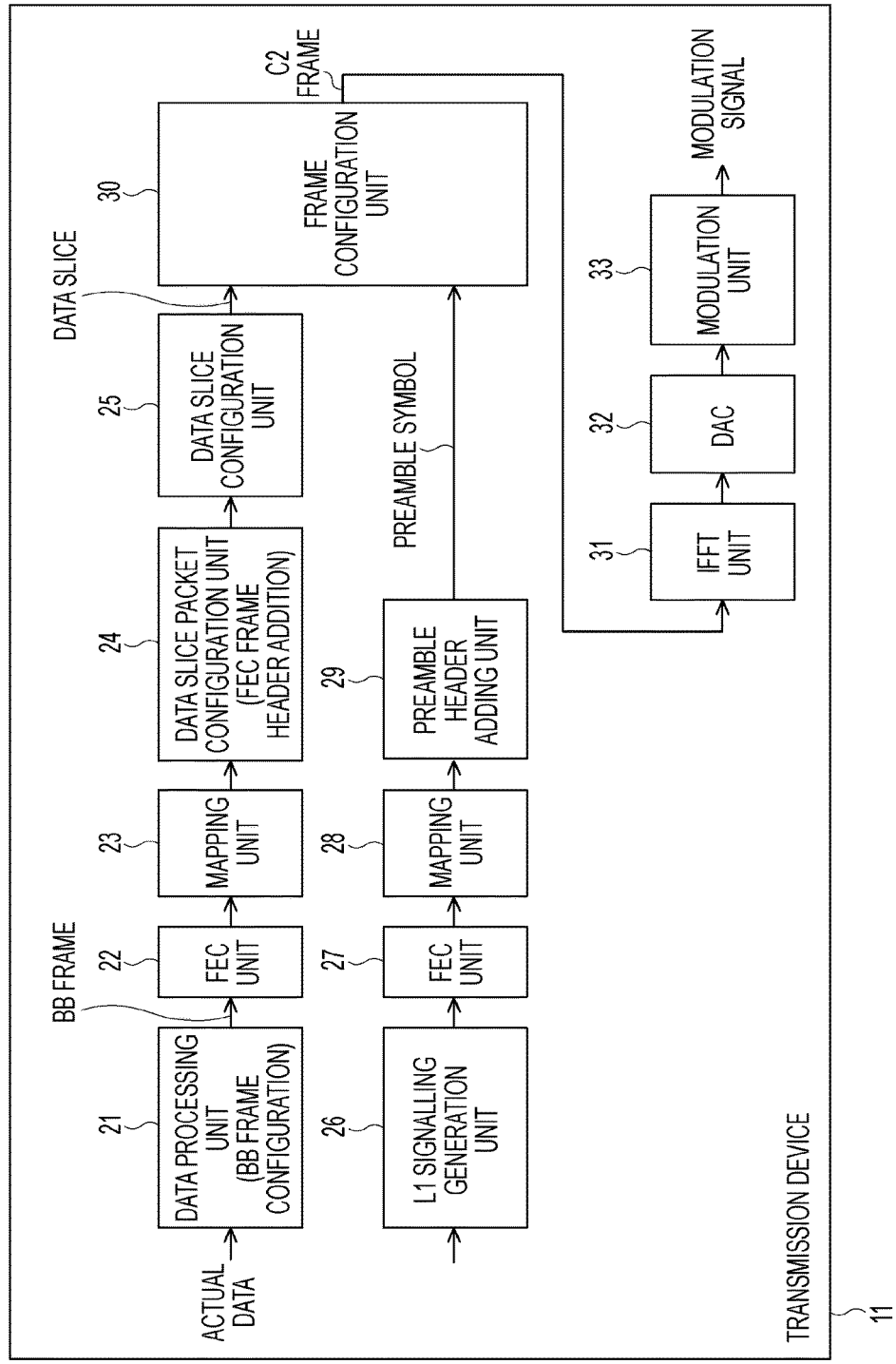
FIG. 2 is a block diagram illustrating an exemplary configuration of a transmission device 11.

FIG. 2 is a block diagram illustrating an exemplary configuration of the transmission device 11 in FIG. 1.

In FIG. 2, the transmission device 11 includes a data processing unit 21, a forward error correction (FEC) unit 22, a mapping unit 23, a data slice packet configuration unit 24, a data slice configuration unit 25, an L1 signalling generation unit 26, an FEC unit 27, a mapping unit 28, a preamble header adding unit 29, a frame configuration unit 30, an inverse fast Fourier transform (IFFT) unit 31, a digital to analog converter (DAC) 32, and a modulation unit 33.

For example, actual data, namely, target data such as a transport stream (TS) are supplied to the data processing unit 21, as PLP.

The data processing unit 21 adds a base band (BB) header to the actual data (PLP) supplied to the data processing unit 21, thereby configuring a BB frame and supplying the BB frame to the FEC unit 22.

The FEC unit 22 executes, for example, error correction coding such as BCH coding and LDPC coding toward the BB frame as a target, received from the data processing unit 21, and supplies an FEC frame obtained as a result to the mapping unit 23.

The mapping unit 23 maps the FEC frame received from the FEC unit 22, in a unit of symbol having a predetermined bit number, onto a signal point on a constellation, determined by a modulation scheme of a predetermined digital quadrature modulation, and then, supplies the symbol as a mapping result to the data slice packet configuration unit 24 in a unit of the FEC frame.

The data slice packet configuration unit 24 adds an FEC frame header to one or two of the FEC frames received from the mapping unit 23, thereby configuring a data slice packet.

Under the DVB-C2, the FEC frame header is L1 signalling part 1. The FEC frame header includes information such as PLP_ID for identifying a PLP configuring an FEC frame to which the FEC frame header is to be added, MODCOD indicating a modulation scheme of the quadrature modulation (MOD) in the mapping of the FEC frame, and a code length in error correction coding executed on the FEC frame.

The data slice packet configuration unit 24 configures a data slice packet and supplies the data slice packet to the data slice configuration unit 25.

The data slice configuration unit 25 configures a data slice from the data slice packet received from the data slice packet configuration unit 24, and supplies the data slice to the frame configuration unit 30.

The L1 signalling generation unit 26 generates L1 signalling including an emergency alarm signal related to emergency alarm, in L1 signalling part 2 under the DVB-C2, including control data needed for demodulation of actual data, and supplies the L1 signalling to the FEC unit 27.

For an emergency alarm signal, a signal of one bit or more can be employed.

Specifically, for the emergency alarm signal, it is possible to employ, for example, a one-bit signal indicating presence or absence of a specific disaster such as an earthquake.

For the emergency alarm signal, it is also possible to employ, for example, a signal with two bits or more, which indicates presence or absence of a disaster such as earthquakes, tsunami, and tornadoes, and the types of the disaster.

Furthermore, for the emergency alarm signal, for example, it is possible to employ a signal with two bits or more, which indicates presence or absence of a specific disaster such as earthquakes and the magnitude of the disaster.

In the present embodiment, in order to simplify description, it is assumed that a one-bit signal is employed as the emergency alarm signal, for example.

The FEC unit 27 executes error correction coding toward the L1 signalling as a target, received from the L1 signalling generation unit 26, and supplies the L1 signalling as a result of the error correction coding, to the mapping unit 28.

The mapping unit 28 maps the L1 signalling received from the FEC unit 27, in a unit of symbol having a predetermined bit number, onto a signal point on a constellation, determined by a modulation scheme of a predetermined digital quadrature modulation, and then, supplies the (a symbol of) the L1 signalling as a mapping result to the preamble header adding unit 29.

The preamble header adding unit 29 adds a preamble header to a head of the L1 signalling received from the mapping unit 23, and supplies a preamble symbol obtained as a result, to the frame configuration unit 30.

The preamble header includes a length, or the like, of the L1 signalling (L1 signalling part 2).

The frame configuration unit 30 configures a C2 frame based on (a symbol of) a data slice received from the data slice configuration unit 25 and a preamble symbol received from the preamble header adding unit 29, and supplies the C2 frame to the IFFT unit 31.

The IFFT unit 31 executes IFFT of the C2 frame received from the frame configuration unit 30 and supplies the signal obtained as a result, to the DAC 32.

The DAC 32 executes DA conversion on the signal received from the IFFT unit 31 and supplies the signal to the modulation unit 33.

The modulation unit 33 modulates the signal received from the DAC 32 into a radio frequency (RF) signal and transmits the RF signal via the transmission path 13 (FIG. 1).

Figure 3:
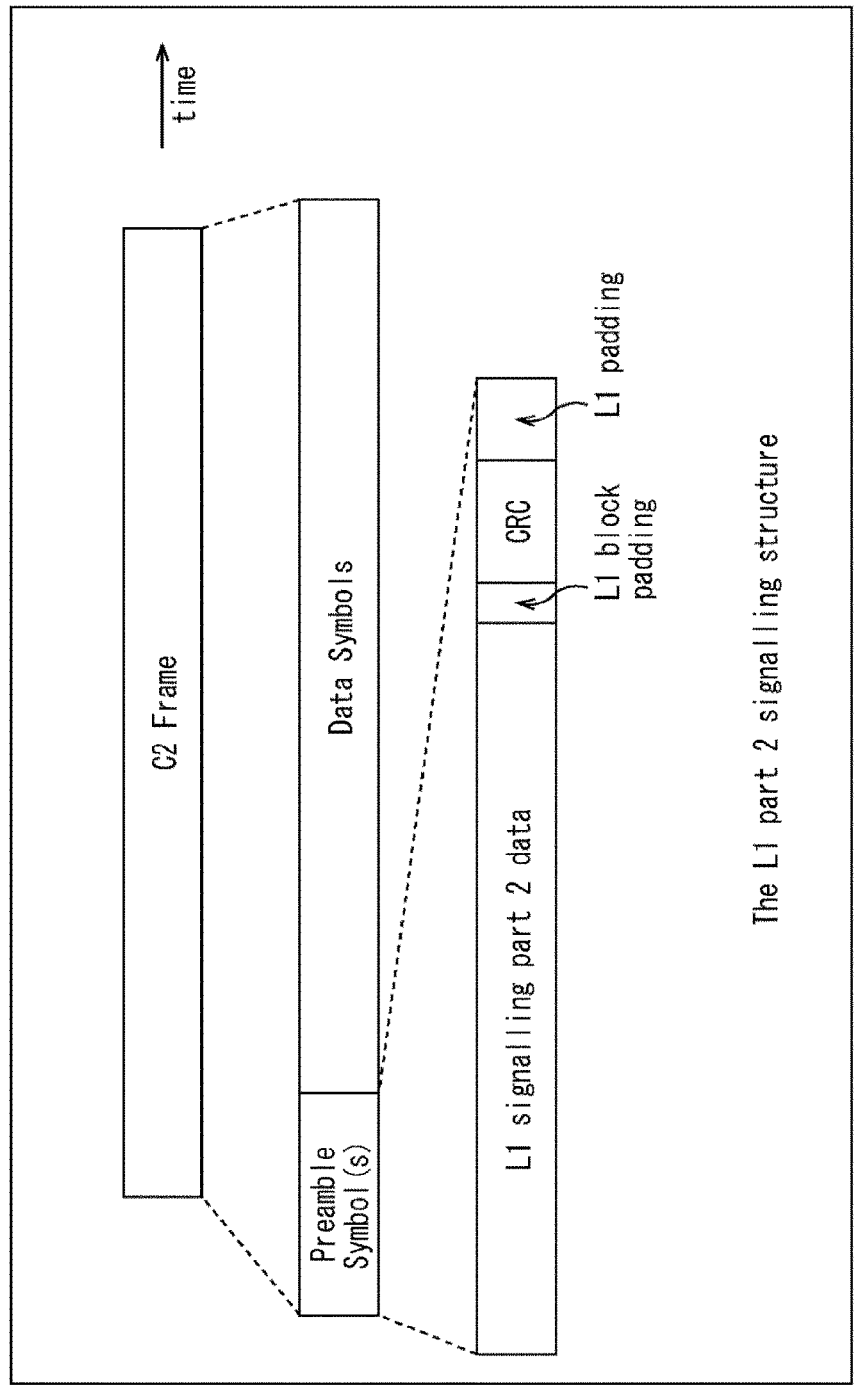
FIG. 3 is a diagram illustrating a structure of a C2 frame to be configured in a frame configuration unit 30.

FIG. 3 is a diagram illustrating a structure of the C2 frame to be configured in the frame configuration unit 30.

The C2 frame is configured with a preamble symbol (or symbols), and data symbols.

The preamble symbol includes the L1 signalling, namely, the L1 signalling part 2 including an emergency alarm signal.

The data symbol is a symbol of a data slice obtained in the data slice configuration unit 25 (FIG. 2).

FIG. 4 is a diagram illustrating a format (syntax) of the L1 signalling part 2.

In the present embodiment, the L1 signalling part 2 represents the L1 signalling part 2 defined in DVB-C.2: ETSI EN 302 769 V1.2.1 (2011 April).

The L1 signalling part 2 includes, as illustrated in FIG. 4, unused fields of RESERVED_1, RESERVED_2, RESERVED_3, and RESERVED_4, indicated by A1, A2, A3, and A4, respectively.

Regarding the emergency alarm signal, it is possible to newly define (one bit or more of) any of the fields RESERVED_1, RESERVED_2, RESERVED_3, and, RESERVED_4 as an emergency alarm field and to include the emergency alarm signal in the emergency alarm field.

Herein, the field RESERVED_1 is present in a loop repeated for the number of PLP, namely, DSLICE_NUM_PLP. Accordingly, in a case where an emergency alarm signal is to be included in the field RESERVED_1, emergency alarm signals as many as the number of PLP would be included.

The field RESERVED_2 is present in a loop repeated for the number of data slices, namely, NUM_DSLICE. Accordingly, in a case where an emergency alarm signal is to be included in the field RESERVED_2, emergency alarm signals as many as the number of data slices would be included.

Furthermore, the field RESERVED_3 is present in a loop repeated for the number of notches, namely, NUM_NOTCH. Accordingly, in a case where an emergency alarm signal is to be included in the field RESERVED_3, emergency alarm signals as many as the number of notches would be included.

Note that the notch is not always present. Therefore, in a case where an emergency alarm signal is to be included in the field RESERVED_3, transmission of the emergency alarm signal would be difficult when the notch is not present.

In contrast, one field RESERVED_4 is always present after a field RESERVED_TONE. Therefore, in a case where an emergency alarm signal is to be included in the field RESERVED_4, it is possible to transmit the emergency alarm signal only once (not plural times) per C2 frame. Accordingly, it is possible to transmit the emergency alarm signal efficiently.

Note that regarding the emergency alarm signal, it is possible to add an emergency alarm field separately from the unused fields RESERVED_1 to RESERVED_4, within the L1 signalling part 2, and to include the emergency alarm signal in the emergency alarm field.

However, adding an emergency alarm field separately from the unused fields RESERVED_1 to RESERVED_4, within the L1 signalling part 2, might affect processing of a reception device conforming to the current DVB-C2 and impair forward compatibility.

Alternatively, the emergency alarm signal can be included in a TS as actual data, not within the L1 signalling part 2.

However, in a case where the emergency alarm signal is to be included in the TS as actual data, not within the L1 signalling part 2, it would be required, in the reception device 12, to execute data symbol decoding in the C2 frame (FIG. 3), TS decoding, or the like in order to obtain the emergency alarm signal. This might increase a transmission delay from transmission of the emergency alarm signal at the transmission device 11 to reception of the emergency alarm signal at the reception device 12.

In particular, in the case of an emergency alarm signal for an earthquake, suppressing a transmission delay to its minimum in the emergency alarm signal is strongly demanded and thus, an increase in the transmission delay would be undesirable.

In contrast, the L1 signalling part 2 is decoded first in the C2 frame, and thus, the transmission delay of the emergency alarm signal is short. Accordingly, by including the emergency alarm signal into the L1 signalling part 2, it is possible to issue the emergency alarm promptly under the DVB-C2.

Figure 5:
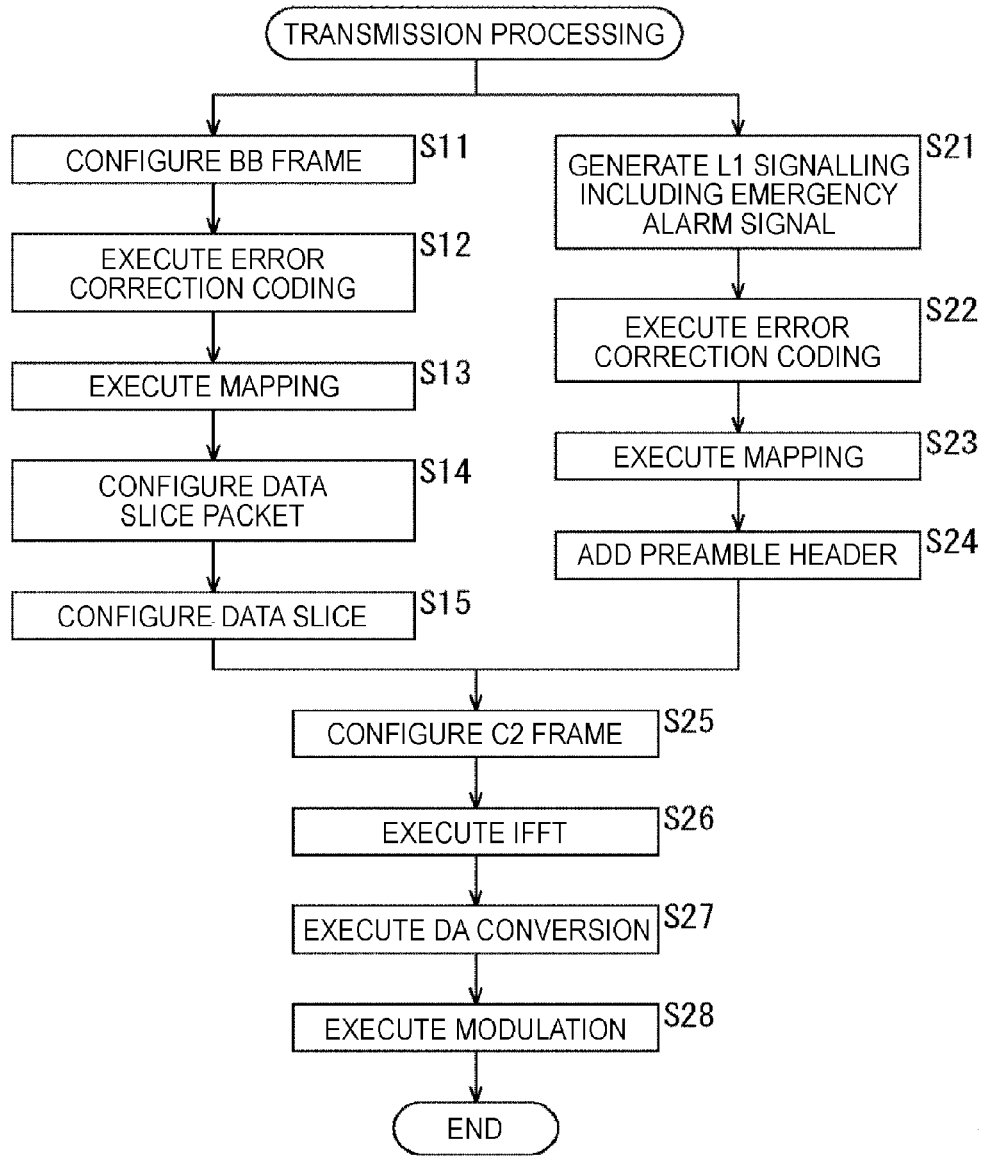
FIG. 5 is a flowchart illustrating exemplary processing (transmission processing) of the transmission device 11.

FIG. 5 is a flowchart illustrating exemplary processing (transmission processing) of the transmission device 11 in FIG. 2.

In transmission processing, at step S11, the data processing unit 21 configures a BB frame by adding a BB header to actual data supplied to the data processing unit 21, or by any other procedure, and supplies the BB frame to the FEC unit 22. Subsequently, processing moves on to step S12.

At step S12, the FEC unit 22 executes error correction coding toward the BB frame as a target, received from the data processing unit 21, and supplies an FEC frame obtained as a result, to the mapping unit 23. Subsequently, processing moves on to step S13.

At step S13, the mapping unit 23 maps the FEC frame received from the FEC unit 22 onto a predetermined signal point on a constellation, in a predetermined unit of bit number as a symbol, and supplies the symbol as a mapping result to the data slice packet configuration unit 24 in a unit of the FEC frame. Subsequently, processing moves on to step S14.

At step S14, the data slice packet configuration unit 24 configures a data slice packet by adding an FEC frame header to the FEC frame received from the mapping unit 23 and supplies the data slice packet to the data slice configuration unit 25. Subsequently, processing moves on to step S15.

At step S15, the data slice configuration unit 25 configures a data slice from a data slice packet received from the data slice packet configuration unit 24 and supplies the data slice, as a data symbol, to the frame configuration unit 30. Subsequently, processing moves on to step S25.

In parallel with the above-described processing of steps S11 to S15, the transmission device 11 executes processing of steps S21 to S24.

Specifically, at step S21, the L1 signalling generation unit 26 generates L1 signalling including an emergency alarm signal, in the L1 signalling part 2 that includes control data needed for demodulation of actual data, and supplies the L1 signalling to the FEC unit 27. Subsequently, processing moves on to step S22.

At step S22, the FEC unit 27 executes error correction coding toward the L1 signalling as a target, received from the L1 signalling generation unit 26, and supplies the L1 signalling as a result of the error correction coding, to the mapping unit 28. Subsequently, processing moves on to step S23.

At step S23, the mapping unit 28 maps the L1 signalling received from the FEC unit 27 onto a signal point on a constellation in a predetermined unit of bit as a symbol, and supplies (the symbol of) the L1 signalling as a mapping result to the preamble header adding unit 29. Subsequently, processing moves on to Step S24.

At step S24, the preamble header adding unit 29 adds a preamble header to a head of the L1 signalling received from the mapping unit 23, and supplies a preamble symbol obtained as a result, to the frame configuration unit 30. Subsequently, processing moves on to step S25.

At step S25, the frame configuration unit 30 configures a C2 frame (FIG. 3) based on a data symbol of a data slice received from the data slice configuration unit 25 and based on a preamble symbol received from the preamble header adding unit 29, and supplies the C2 frame to the IFFT unit 31. Subsequently, processing moves on to step S26.

At step S26, the IFFT unit 31 executes IFFT on the C2 frame received from the frame configuration unit 30 and supplies the signal obtained as a result, to the DAC 32. Subsequently, processing moves on to step S27.

At step S27, the DAC 32 executes DA conversion on the signal received from the IFFT unit 31 and supplies the signal to the modulation unit 33. Subsequently, processing moves on to step S28.

At step S28, the modulation unit 33 modulates the signal received from the DAC 32 into an RF signal and transmits the signal via the transmission path 13 (FIG. 1).

<Exemplary Configuration of Reception Device 12>

Figure 6:
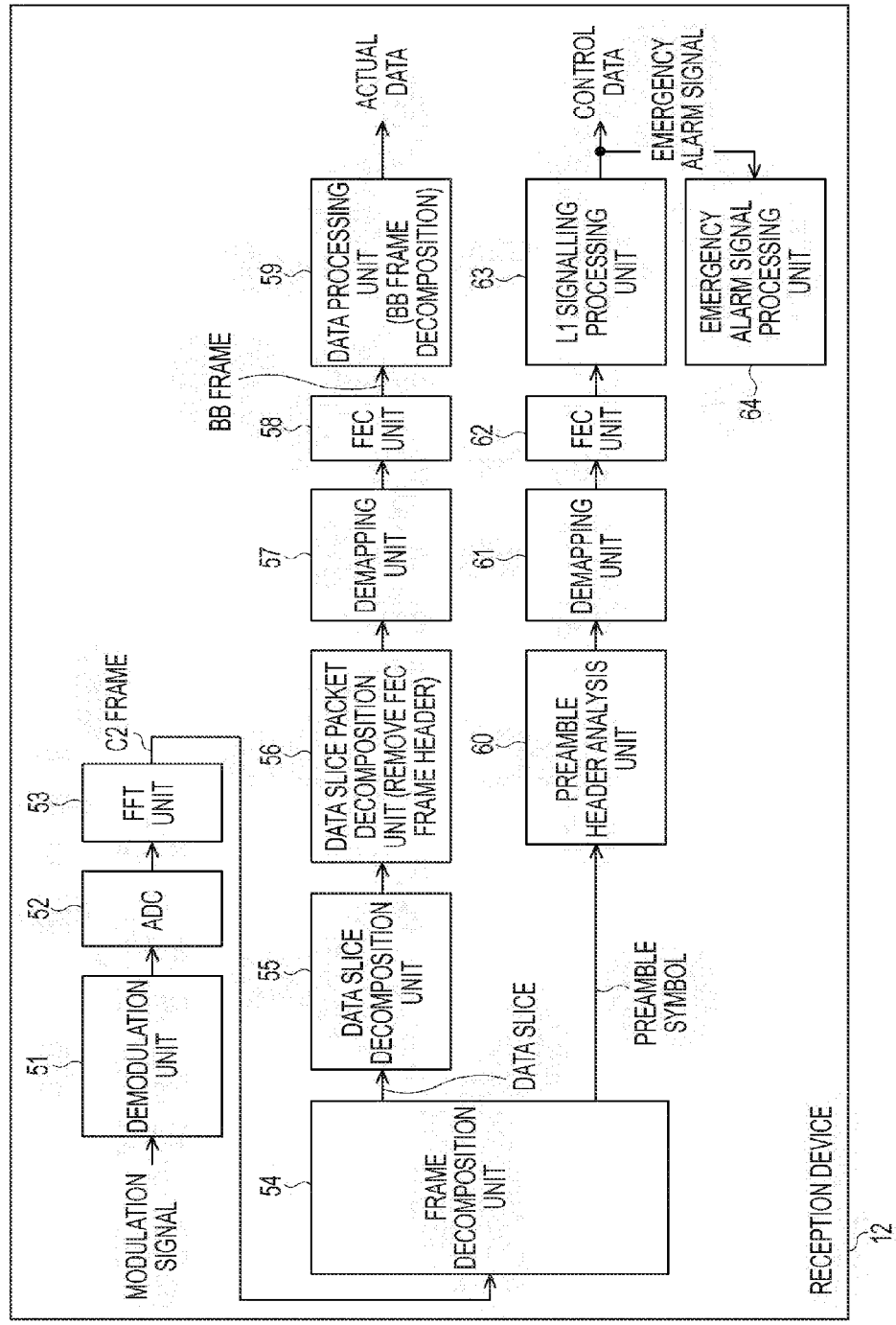
FIG. 6 is a block diagram illustrating an exemplary configuration of a reception device 12.

FIG. 6 is a block diagram illustrating an exemplary configuration of the reception device 12 in FIG. 1.

In FIG. 6, the reception device 12 includes a demodulation unit 51, an analog to digital converter (ADC) 52, a fast Fourier transform (FFT) unit 53, a frame decomposition unit 54, a data slice decomposition unit 55, a data slice packet decomposition unit 56, a demapping unit 57, an FEC unit 58, a data processing unit 59, a preamble header analysis unit 60, a demapping unit 61, an FEC unit 62, an L1 signalling processing unit 63, and an emergency alarm signal processing unit 64.

The demodulation unit 51 receives the RF signal transmitted from the transmission device 11 via the transmission path 13 (FIG. 1). The demodulation unit 51 demodulates the RF signal and supplies a demodulated signal obtained as a result, to the ADC 52.

The ADC 52 executes AD conversion on the demodulated signal received from the demodulation unit 51 and supplies a digital signal obtained as a result, to the FFT unit 53.

The FFT unit 53 executes FFT on the digital signal received from the ADC 52 and supplies a C2 frame (signal) obtained as a result, to the frame decomposition unit 54.

The frame decomposition unit 54 decomposes the C2 frame (FIG. 3) received from the FFT unit 53 into a data symbol (data slice symbol) and a preamble symbol. The frame decomposition unit 54 then supplies the data symbol to the data slice decomposition unit 55, while supplying the preamble symbol to the preamble header analysis unit 60.

The data slice decomposition unit 55 decomposes the data symbol, namely, the data slice (symbol), received from the frame decomposition unit 54 into a data slice packet and supplies it to the data slice packet decomposition unit 56.

The data slice packet decomposition unit 56 removes an FEC frame header from the data slice packet received from the data slice decomposition unit 55, thereby decomposing the data slice packet into an FEC frame and supplies it to the demapping unit 57.

At this, based on the FEC frame header removed at the data slice packet decomposition unit 56, a modulation scheme, a code length, or the like, are recognized, and the demapping unit 57 and the FEC unit 58 in the latter stage are controlled.

The demapping unit 57 executes demapping on the FEC frame (symbol) received from the data slice packet decomposition unit 56 and supplies the demapped FEC frame (symbol) to the FEC unit 58.

The FEC unit 58 executes decoding of the error correction code toward the demapped FEC frame received from the demapping unit 57, as error correction corresponding to error correction coding of the FEC unit 22 in FIG. 2, thereby restoring the BB frame obtained by the data processing unit 21 in FIG. 2 and supplies the BB frame to the data processing unit 59.

The data processing unit 59 decomposes the BB frame received from the FEC unit 58 and restores and outputs the actual data.

The preamble header analysis unit 60 analyzes a preamble header included in a preamble symbol received from the frame decomposition unit 54, thereby recognizing the length of the L1 signalling (L1 signalling part 2 including an emergency alarm signal) included in the preamble symbol, extracts the L1 signalling and supplies it to the demapping unit 61.

The demapping unit 61 demaps the L1 signalling (symbol) received from the preamble header analysis unit 60 and supplies the demapped L1 signalling (symbol) to the FEC unit 62.

The FEC unit 62 executes decoding of the error correction code toward the demapped L1 signalling received from the demapping unit 61, as error correction corresponding to error correction coding of the FEC unit 27 in FIG. 2, thereby restoring the L1 signalling obtained at the L1 signalling generation unit 26 in FIG. 2 and supplies the restored L1 signalling to the L1 signalling processing unit 63.

The L1 signalling processing unit 63 processes the L1 signalling received from the FEC unit 62, thereby restoring and outputting control data included in the L1 signalling. Each of units configuring the reception device 12 is controlled according to the control data.

The L1 signalling processing unit 63 processes the L1 signalling received from the FEC unit 62, thereby restoring an emergency alarm signal included in the L1 signalling and supplies the restored emergency alarm signal to the emergency alarm signal processing unit 64.

The emergency alarm signal processing unit 64 outputs an emergency alarm in response to the emergency alarm signal received from the L1 signalling processing unit 63.

Specifically, when the emergency alarm signal received from the L1 signalling processing unit 63 indicates, for example, occurrence of an earthquake, the emergency alarm signal processing unit 64 outputs an emergency alarm using an image, sound, or the like.

Figure 7:
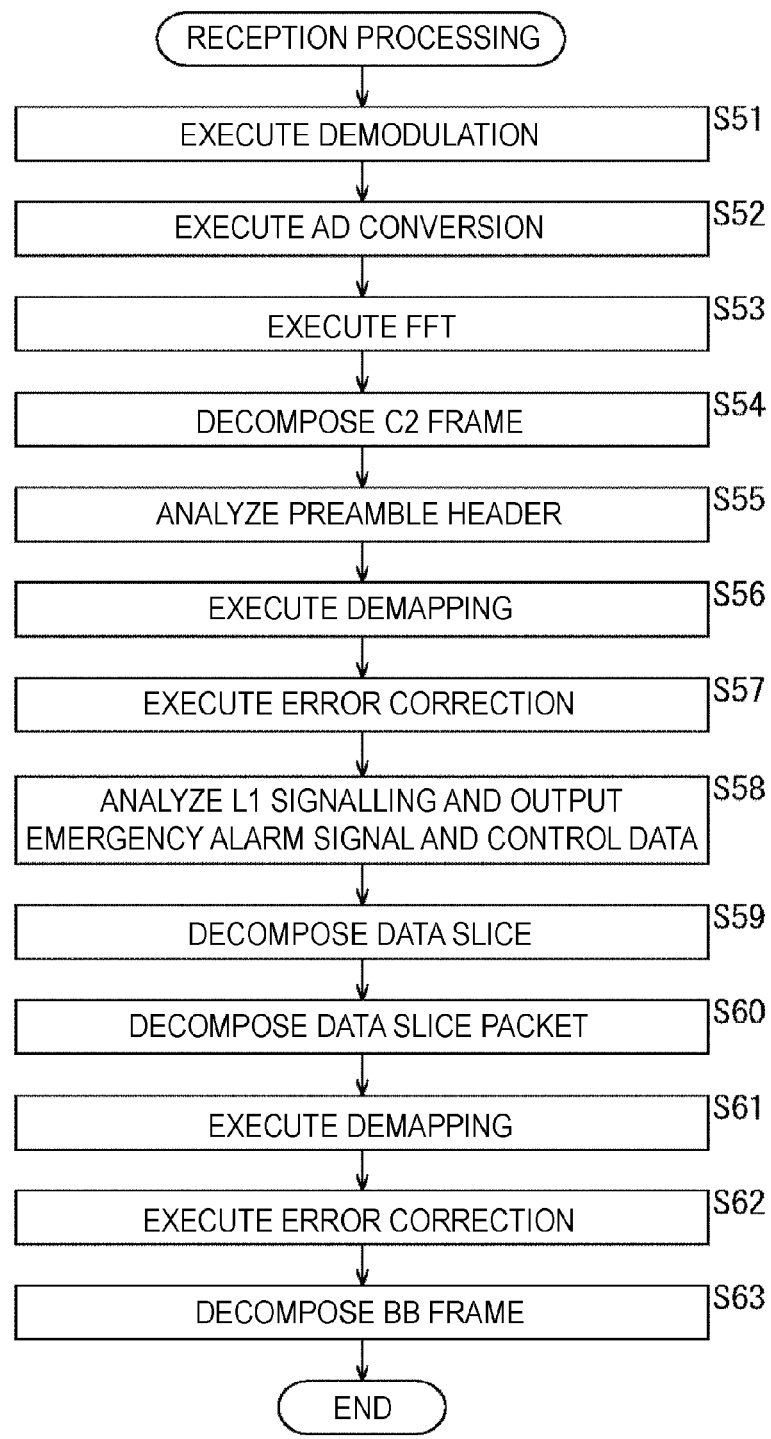
FIG. 7 is a flowchart illustrating processing (reception processing) of the reception device 12.

FIG. 7 is a flowchart illustrating processing (reception processing) of the reception device 12 in FIG. 6.

At step S51, the demodulation unit 51 receives and demodulates an RF signal, and supplies a demodulated signal obtained as a result, to the ADC 52. Subsequently, processing moves on to step S52.

At step S52, the ADC 52 executes AD conversion on the demodulated signal received from the demodulation unit 51, and supplies a digital signal obtained as a result, to the FFT unit 53. Subsequently, processing moves on to step S53.

At step S53, the FFT unit 53 executes FFT on the digital signal received from the ADC 52, and supplies a C2 frame obtained as a result, to the frame decomposition unit 54. Subsequently, processing moves on to step S54.

At step S54, the frame decomposition unit 54 decomposes the C2 frame received from the FFT unit 53 into a data slice (data symbol) and a preamble symbol. The frame decomposition unit 54 then supplies the data slice to the data slice decomposition unit 55, while supplying the preamble symbol to the preamble header analysis unit 60. Subsequently, processing moves on to step S55.

At step S55, the preamble header analysis unit 60 analyzes a preamble header included in the preamble symbol received from the frame decomposition unit 54, extracts L1 signalling from the preamble symbol, and supplies the L1 signalling to the demapping 61. Subsequently, processing moves on to step S56.

At step S56, the demapping unit 61 executes demapping on the L1 signalling received from the preamble header analysis unit 60 and supplies the demapped L1 signalling to the FEC unit 62. Subsequently, processing moves on to step S57.

At step S57, the FEC unit 62 executes error correction on the demapped L1 signalling received from the demapping unit 61 and supplies the error-corrected L1 signalling to the L1 signalling processing unit 63. Subsequently, processing moves on to step S58.

At step S58, the L1 signalling processing unit 63 processes the L1 signalling received from the FEC unit 62, thereby restoring and outputting control data included in the L1 signalling. The L1 signalling processing unit 63 processes the L1 signalling received from the FEC unit 62, thereby restoring an emergency alarm signal included in the L1 signalling and supplies the restored emergency alarm signal to the emergency alarm signal processing unit 64.

The control data included in the L1 signalling includes information needed for decoding the data slice (data symbol). When the control data included in the L1 signalling is obtained at the L1 signalling processing unit 63, it is possible, based on the control data, to decode the data slice (data symbol) at the data slice decomposition unit 55 or at the data processing unit 59.

That is, at step S59, the data slice decomposition unit 55 decomposes the data slice (symbol) received from the frame decomposition unit 54 into data slice packets and supplies the data slice packets to the data slice packet decomposition unit 56. Subsequently, processing moves on to step S60.

At step S60, the data slice packet decomposition unit 56 decomposes the data slice packets received from the data slice decomposition unit 55 into an FEC frame and supplies it to the demapping unit 57. Subsequently, processing moves on to step S61.

At step S61, the demapping unit 57 executes demapping on the FEC frame (symbol) received from the data slice packet decomposition unit 56 and supplies the demapped FEC frame (symbol) to the FEC unit 58. Subsequently, processing moves on to step S62.

At step S62, the FEC unit 58 executes error correction on the demapped FEC frame received from the demapping unit 57, and supplies the BB frame obtained as a result, to the data processing unit 59. Subsequently, processing moves on to step S63.

At step S63, the data processing unit 59 decomposes the BB frame received from the FEC unit 58 and restores and outputs the actual data.

On the transmission device 11 in FIG. 2, the emergency alarm signal is included in the L1 signalling part 2. Accordingly, on the reception device 12 in FIG. 6, it is possible to obtain the emergency alarm signal included in the L1 signalling part 2 with a short transmission delay. As a result, it is possible for the reception device 12 to issue an emergency alarm promptly.

<Description of Computer Utilizing Present Technique>

A series of processes described above can be executed in hardware or with software. When the series of processes is executed with software, a program included in the software is installed in a general-purpose computer, or the like.

Figure 8:
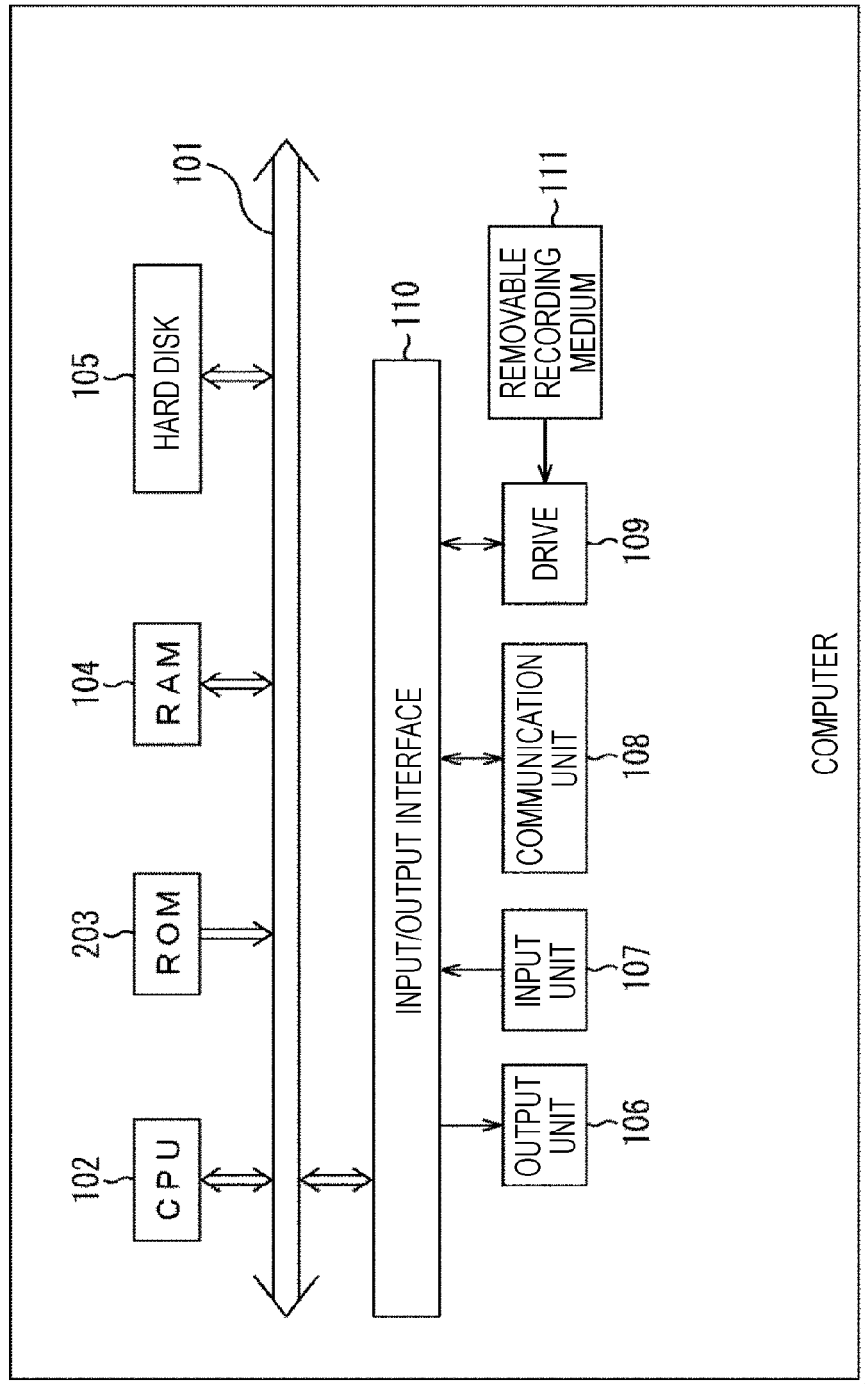
FIG. 8 is a block diagram illustrating an exemplary configuration of an embodiment of a computer to which the present technique is applied.

Accordingly, FIG. 8 illustrates an exemplary configuration of a computer according to an embodiment, in which a program configured to execute the above-described series of processes is installed.

The program can be previously recorded in a hard disk 105 or a ROM 103, as a recording medium built into the computer.

Alternatively, the program can be stored (recorded) in a removable recording medium 111. The removable recording medium 111 can be supplied as package software. Examples of the removable recording medium 111 include a flexible disk, a compact disc read only memory (CD-ROM), a magneto optical (MO) disk, a digital versatile disc (DVD), a magnetic disk, and a semiconductor memory.

The program can be installed from the above-described removable recording medium 111 to the computer. Alternatively, the program can be downloaded to the computer via a communication network or a broadcasting network, and can be installed onto the built-in hard disk 105. Specifically, the program can be transferred, for example, from a downloading site to the computer wirelessly via an artificial satellite for digital satellite broadcasting, or can be transferred by wire to the computer via a network such as a local area network (LAN) and the Internet.

The computer incorporates a central processing unit (CPU) 102. The CPU 102 is connected to an input/output interface 110 via a bus 101.

When an instruction is input into the CPU 102 by operation, or the like, by a user, on an input unit 107 via the input/output interface 110, the CPU 102 executes a program stored in the read only memory (ROM) 103 according to the instruction. Alternatively, the CPU 102 loads the program stored in the hard disk 105 to a random access memory (RAM) 104 and executes the program.

With this procedure, the CPU 102 executes processing according to the above-described flowchart or processing done by the above-described configuration in the block diagram. Subsequently, the CPU 102 permits a processing result, as required, for example, to be output from an output unit 106, transmitted from a communication unit 108, recorded in the hard disk 105, via the input/output interface 110.

The input unit 107 includes a keyboard, a mouse, and a microphone. The output unit 106 includes a liquid crystal display (LCD) and a speaker.

In this description, processing executed by a computer in accordance with a program need not be performed in time series along the order described in the flowchart. That is, processing executed by the computer according to the program includes processing executed in parallel or separately (e.g. parallel processing, or object processing).

The program can be processed by one computer (processor) or can be processed with distributed processing by a plurality of computers. Furthermore, the program can be transferred to a remote computer and be executed.

Furthermore, in the present description, the system represents a set of multiple constituents (devices, modules (parts), or the like). In other words, all the constituents may be in a same housing but they do not have to be in the same housing. Accordingly, a plurality of devices, housed in separate housings, connected via a network can be a system. A device in which a plurality of modules is housed in one housing can also be a system.

Embodiments of the present technique are not limited to the above-described embodiments but can be modified in a variety of ways within a scope of the present technique.

For example, the present technique can be configured as a form of cloud computing in which one function is shared in cooperation for processing among a plurality of devices via a network.

Each of steps described in the above flowcharts can be executed on one device or shared by a plurality of devices for processing.

Furthermore, when one step includes a plurality of stages of processing, the plurality of stages of processing included in the one step can be executed on one device or can be shared by a plurality of devices.

Note that effects described herein are provided for purposes of exemplary illustration and are not intended to be limiting. Still other effects may also be contemplated.

The present technique can be configured as follows.

<1>

A data processing device including a generation unit configured to generate, in L1 signalling part 2 under the digital video broadcasting (DVB)-C2, L1 signalling including an emergency alarm signal related to an emergency alarm.

<2>

The data processing device according to <1>, wherein the emergency alarm signal is a signal of one bit or more.

<3>

The data processing device according to <1> or <2>, wherein the emergency alarm signal is a signal of one bit.

<4>

The data processing device according to any of <1> to <3>, wherein the emergency alarm signal is included in RESERVED_4 of the L1 signalling part 2.

<5>

The data processing device according to any of <1> to <3>, wherein the emergency alarm signal is included in RESERVED_1, RESERVED_2, or RESERVED_3, of the L1 signalling part 2.

<6>

The data processing device according to any of <1> to <3>, wherein the emergency alarm signal is included after RESERVED_TONE of the L1 signalling part 2.

<7>

A data processing method including generating, in L1 signalling part 2 under the digital video broadcasting (DVB)-C2, L1 signalling including an emergency alarm signal related to an emergency alarm.

<8>

A data processing device including a processing unit configured to process L1 signalling obtained from data transmitted from a transmission device equipped with a generation unit configured to generate, in L1 signalling part 2 under the digital video broadcasting (DVB)-C2, the L1 signalling including an emergency alarm signal related to an emergency alarm.

<9>

The data processing device according to <8>, wherein the emergency alarm signal is a signal of one bit or more.

<10>

The data processing device according to <8> or <9>, wherein the emergency alarm signal is a signal of one bit.

<11>

The data processing device according to any of <8> to <10>, wherein the emergency alarm signal is included in RESERVED_4 of the L1 signalling part 2.

<12>

The data processing device according to any of <8> to <10>, wherein the emergency alarm signal is included in RESERVED_1, RESERVED_2, or RESERVED_3, of the L1 signalling part 2.

<13>

The data processing device according to any of <8> to <10>, wherein the emergency alarm signal is included after RESERVED_TONE of the L1 signalling part 2.

<14>

A data processing method including processing L1 signalling obtained from data transmitted from a transmission device equipped with a generation unit configured to generate, in L1 signalling part 2 under the digital video broadcasting (DVB)-C2, the L1 signalling including an emergency alarm signal related to an emergency alarm.

REFERENCE SIGNS LIST 11 transmission device
12 reception device
13 transmission path
21 data processing unit
22 FEC unit
23 mapping unit
24 data slice packet configuration unit
25 data slice configuration unit
26 L1 signalling generation unit
27 FEC unit
28 mapping unit
29 preamble header adding unit
30 frame configuration unit
31 IFFT unit
32 DAC
33 modulation unit
51 demodulation unit
52 ADC
53 FFT unit
54 frame decomposition unit
55 data slice decomposition unit
56 data slice packet decomposition unit
57 demapping unit
58 FEC unit
59 data processing unit
60 preamble header analysis unit
61 demapping unit
62 FEC unit
63 L1 signalling processing unit
64 emergency alarm signal processing unit
101 bus
102 CPU
103 ROM
104 RAM
105 hard disk
106 output unit
107 input unit
108 communication unit
109 drive
110 input/output interface
111 removable recording medium

The invention claimed is:

1. A data processing device comprising:
    processing circuitry configured to
        generate L1 signaling part 2 data under the digital video broadcasting (DVB)-C2, the L1 signaling part 2 data including an emergency alarm signal related to an emergency alarm, and
        generate a transmission frame that includes a preamble portion and a data portion, the preamble portion including the L1 signaling part 2 data; and
    a transmitter configured to transmit the generated transmission frame to a data receiving device which presents the emergency alarm to a user based on the emergency alarm signal, wherein
    the L1 signaling part 2 data includes control data used to demodulate the data portion.

2. The data processing device according to claim 1, wherein the emergency alarm signal is a signal of one bit or more.

3. The data processing device according to claim 1, wherein the emergency alarm signal is a signal of one bit.

4. The data processing device according to claim 3, wherein the emergency alarm signal is included in RESERVED_4 of the L1 signaling part 2 data.

5. The data processing device according to claim 3, wherein the emergency alarm signal is included in RESERVED_1, RESERVED_2, or RESERVED_3, of the L1 signaling part 2 data.

6. The data processing device according to claim 3, wherein the emergency alarm signal is included after RESERVED_TONE of the L1 signaling part 2 data.

7. The data processing device according to claim 1, wherein the transmission frame is a DVB-C2 frame.

8. The data processing device according to claim 1, wherein the emergency alarm signal is only included once per transmission frame.

9. A data processing method comprising:
generating L1 signaling part 2 data under the digital video broadcasting (DVB)-C2, the L1 signaling part 2 data including an emergency alarm signal related to an emergency alarm; and
generating, by circuitry of a data processing device, a transmission frame that includes a preamble portion and a data portion, the preamble portion including the L1 signaling part 2 data; and
transmitting the generated transmission frame to a data receiving device which presents the emergency alarm to a user based on the emergency alarm signal, wherein
the L1 signaling part 2 data includes control data used to demodulate the data portion.

10. A data processing device comprising:
a receiver configured to receive a transmission frame, the transmission frame including a preamble portion and a data portion, the preamble portion including L1 signaling part 2 data under the digital video broadcasting (DVB)-C2; and
processing circuitry configured to
process the L1 signaling part 2 data obtained from the received transmission frame, the L1 signaling part 2 data including an emergency alarm signal related to an emergency alarm, and
output the emergency alarm based on the emergency alarm signal for presentation to a user, wherein
the L1 signaling part 2 data includes control data used to demodulate the data portion.

11. The data processing device according to claim 10, wherein the emergency alarm signal is a signal of one bit or more.

12. The data processing device according to claim 10, wherein the emergency alarm signal is a signal of one bit.

13. The data processing device according to claim 12, wherein the emergency alarm signal is included in RESERVED_4 of the L1 signaling part 2 data.

14. The data processing device according to claim 12, wherein the emergency alarm signal is included in RESERVED_1, RESERVED_2, or RESERVED_3, of the L1 signaling part 2 data.

15. The data processing device according to claim 12, wherein the emergency alarm signal is included after RESERVED_TONE of the L1 signaling part 2 data.

16. The data processing device according to claim 10, wherein the emergency alarm signal is only included once per transmission frame.

17. A data processing method comprising:
receiving a transmission frame, the transmission frame including a preamble portion and a data portion, the preamble portion including L1 signaling part 2 data under the digital video broadcasting (DVB)-C2 standard;
processing, by circuitry of a data processing device, the L1 signaling part 2 data obtained from the received transmission frame, the L1 signaling part 2 data including an emergency alarm signal related to an emergency alarm; and
outputting, by the circuitry of the data processing device, the emergency alarm based on the emergency alarm signal for presentation to a user, wherein
the L1 signaling part 2 data includes control data used to demodulate the data portion.

* * * * *